United States Patent [19]

Krämer

[11] 4,101,542
[45] Jul. 18, 1978

[54] PROCESS FOR THE SELECTIVE DESTRUCTION, BY REDUCTION, OF P-COUPLED PRODUCTS OF THE 1-NAPHTHOL SERIES

[75] Inventor: Erich Krämer, Bergisch-Gladbach, Germany

[73] Assignee: Bayer Aktiengesellschaft, Leverkusen, Germany

[21] Appl. No.: 745,400

[22] Filed: Nov. 26, 1976

[30] Foreign Application Priority Data

Nov. 28, 1975 [DE] Fed. Rep. of Germany ....... 2553443
Oct. 1, 1976 [DE] Fed. Rep. of Germany ....... 2644433

[51] Int. Cl.² ...................... C09B 29/00; C09B 41/00; C09B 46/00
[52] U.S. Cl. .................................... 260/158; 260/144; 260/181; 260/187; 260/191; 260/199; 260/202; 260/208; 260/508; 260/509; 260/510; 260/569; 260/578

[58] Field of Search ............... 260/208, 569, 578, 508, 260/509, 510, 158, 181, 187, 191, 199, 202, 144

[56] References Cited
PUBLICATIONS

Houben–Weyl (I), Methoden der Organische Chemie, vol. X/2, p. 716, (1967).
Houben–Weyl (II), Methoden der Organische Chemie, vol. XI/1, pp. 522–526, (1957).
Whitmore et al., J. Am. Chem. Soc., vol. 59, pp. 1500–1503, (1937).

*Primary Examiner*—Floyd D. Higel
*Attorney, Agent, or Firm*—Plumley and Tyner

[57] ABSTRACT

Para-coupled products of the 1-naphthol series can be destroyed in the presence of the ortho-coupled product by reduction with salts of dithionous acid or of hydroxymethanesulphinic acid or with hydrazine optionally in the presence of redox-catalysts.

4 Claims, No Drawings

PROCESS FOR THE SELECTIVE DESTRUCTION, BY REDUCTION, OF P-COUPLED PRODUCTS OF THE 1-NAPHTHOL SERIES

During the preparation of azo dyestuffs of the 1-naphthol series, the diazonium compounds couple in the o-position or p-position relative to the OH group when these positions in the naphthalene nucleus are not blocked by other substituents.

The o-coupled products of 1-naphtholsulphonic acids, amino-1-naphtholsulphonic acids and acylamino-1-naphtholsulphonic acids are of great importance in practice, whilst the p-coupled products are usually undesired because they have an adverse effect on the shade and the fastness properties of the desired dyestuff. Although the undesired coupled product can, in individual cases, be largely suppressed by varying the reaction conditions (Helv. Chim. Acta 40 (1957) 1955 to 1978) or arises to only a minor extent for reasons of structure, for example because of steric hindrance, it can, however, never be completely avoided and is formed to a considerable extent in the case of a large number of important dyestuffs.

Hitherto, it has been possible to separate off the p-product from the desired o-product only in cases where the two compounds differ drastically in solubility and even then only via isolation of the dyestuff. This method can, of course, not be employed when, as is demanded by the consumer today, concentrated solutions of azo dyestuffs, with which intermediate isolation of the desired dyestuff must be dispensed with for reasons of economy, are prepared.

A completely novel route for the preparation of dyestuffs of the 1-naphthol series, in which the diazo component is coupled in the o-position relative to the OH group and which are free from the corresponding p-coupled products, has now been found, which is based on the concept of converting the undesired coupled products selectively, by chemical changes, into colourless products.

The subject of the invention is a process for the selective destruction of p-coupled products in the presence of o-coupled products of the 1-naphthol series, characterised in that the p-coupled products are destroyed by reduction with hydrazine, optionally in the presence of redox-catalysts, or with salts of dithionous acid or of hydroxymethanesulphinic acid.

The reducing properties of the products mentioned have long been known and are also used for the destruction of azo dyestuffs, for example with decolorising agents and in discharge printing. However, it was not known and must be described as extremely surprising that the p-coupled products of 1-naphthol and its derivatives react selectively, alongside the o-coupled products, with the reducing agents mentioned.

In order to destroy the p-coupled products, the procedure is that the reaction mixture obtained after the coupling reaction is rendered slightly acid (pH > 4, preferably 4 to 6) and treated with hydrazine or a salt of hydrazine, with sodium dithionite or sodium hydroxymethylsulphinate. If hydrazine is used redox-catalysts can be added to accelerate the reaction. Effective are the convenient hydration catalysts like Raney-Nickel or finely divided platinum or palladium. Further suitable catalysts are elements which have ions or complex ions in different stages of oxidation of which at least one oxidation stage has characteristic reducing properties, e.g. Fe ($Fe^{++}$), Cu ($Cu^+$), S ($S^{--}$). Of course, the catalysts can be used as salts of higher stages of oxidation if this higher stage is reduced by hydrazine. The destruction of the undesired dyestuff takes 1 to 10 hours, depending on the type of dyestuff.

The solution thus obtained can be used direct, if necessary after a filtration which may be required, as a concentrated dyestuff solution. However, if it is intended to isolate the desired dyestuff, prepared by o-coupling, in a solid form, the destruction of the undesired component is followed by the customary isolation of the desired dye-stuff by salting out.

The amount of reducing agent required varies, of course, with the concentration of the by-product and must be decided from values based on experience, since, in general, the precise numerical value of the concentration of the by-product is not known. 1 mol of hydrazine and 2 mols of sodium dithionite or sodium hydroxymethanesulphinate respectively are required per mol of monoazo dyestuff to be destroyed; accordingly, 2 mols respectively 4 mols of reducing agent are required for 1 mol of disazo dyestuff. In general, the reduction proceeds more readily and at lower temperatures with sodium dithionite than with sodium hydroxymethanesulphinate or with hydrazine. In general, small excesses of the reducing agent are not troublesome but larger excesses should, however, be avoided because otherwise the yield of the desired product is reduced. The reduction is usually carried out at temperatures between 10° and 100° C.

Examples of coupling components of the 1-naphthol series are 1-naphthol-3-, -5-, -6-, -7- and -8-sulphonic acid, 1-naphthol-3,6-, -3,7- and -5,7-disulphonic acid, 6- and 7-amino-1-naphthol-3-sulphonic acid, 6- and 7-acetylamino-1-naphthol-3-sulphonic acid, 6- and 7-benzoylamino-1-naphthol-3-sulphonic acid, 8-amino-1-naphthol-5-sulphonic acid, 8-acetylamino-, 8-benzoylamino-, 8-methylsulphonylamino- and 8-phenylsulphonylamino-1-naphthol-5-sulphonic acid, 8-amino-, 8-acetylamino- and 8-benzoylamino-1-naphthol-3,6- and -3,5-disulphonic acid, 8-amino-1-naphthol-5,7-disulphonic acid, 7-phenylamino-1-naphthol-3-sulphonic acid and 6-(4-methoxyphenylamino)-1-naphthol-3-sulphonic acid.

For the process according to the invention, no restrictions exist with regard to the diazo components. However, those dyestuffs which contain groups which can be reduced by sodium dithionite or sodium hydroxymethanesulphinate, for example the nitro group, are, of course, excluded from the process according to the invention.

The process is not restricted to monoazo dyestuffs. However, in the case of dyestuffs which contain more than one azo bridge, preliminary experiments must be carried out to clarify whether all the azo groups of the undesired product are destroyed by reduction before the desired product is attacked.

The salts of dithionous acid and of hydroxymethanesulphinic acid which are used are, in general, the sodium salts, but the nature of the cation is not critical for the process claimed and other cations are also possible, for example lithium, potassium or ammonium.

EXAMPLE 1

17.3 g of 4-aminobenzenesulphonic acid are stirred in 300 ml of water at 0° C. 25 ml of hydrochloric acid (19.5° Bé) are added and a solution of 6.9 g of sodium nitrite in 25 ml of water is added dropwise in the course of 10 minutes. The mixture is allowed to react for a further 15 minutes in the presence of the excess nitrous acid and the excess is then destroyed with amidosulphonic acid. The resulting suspension is allowed to run into a solution of 28.1 g of 6-acetylamino-1-naphthol-3-sulphonic acid in 300 ml of ice water, after 30 g of sodium carbonate has been added. A solution of a dyestuff which is coupled in the o-position relative to the OH group and in which the p-coupled product can be detected by paper chromatography (flow agent: 105 ml of ethyl acetate, 75 ml of pyridine and 60 ml of water) is obtained. The pH of the solution is adjusted to 5 with hydrochloric acid and 1.7 g of sodium dithionite are added. After several hours, the by-product has been destroyed and the dyestuff is salted out.

EXAMPLE 2

17.3 g of 4-aminobenzenesulphonic acid are diazotised as in Example 1 and 34.3 g of 6-benzoylamino-1-naphthol-3-sulphonic acid, dissolved in 300 ml of ice water, are added. Triethanolamine is added dropwise to the solution until the pH remains constant at 5. When coupling is complete, 1.7 g of sodium dithionite are added. After 5 hours no further p-coupled product, which was detectable in the dye-stuff solution obtained after coupling, can be detected in the flow agent mentioned in Example 1.

EXAMPLE 3

If the procedure is as in Example 2 but 3.4 g of sodium hydroxymethanesulphinate are added and the mixture is stirred for 5 hours, a solution which is free from p-coupled product is obtained.

Analogously to Example 1, 2 or 3 it is possible, using sodium hydroxymethanesulphinate or sodium dithionite at pH 5, to destroy the proportions of p-coupled product which are obtained when the dyestuffs are prepared in the presence of the coupling bases mentioned.

| Diazo component | Coupling component | Coupling base |
|---|---|---|
| 4-Aminoazobenzene-3,4'-disulphonic acid | 6-Benzoylamino-1-naphthol-3-sulphonic acid | Sodium carbonate |
| 4-Aminoazobenzene-3,4'-disulphonic acid | 6-Acetalamino-1-naphthol-3-sulphonic acid | sodium carbonate |
| Aniline-4-sulphonic acid | 8-Acetylamino-1-naphthol-3,6-disulphonic acid | Sodium carbonate |
| Aniline-4-sulphonic acid | 8-Benzoylamino-1-naphthol-3,6-disulphonic acid | Triethanolamine |
| 4-Amino-azobenzene-3,4'-disulphonic acid | 1-Naphthol-3-sulphonic acid | Triethanolamine |
| 4-Amino-azobenzene-4'-sulphonic acid | 1-Naphthol-3-sulphonic acid | Triethanolamine |
| 6-Methyl-2-(4-amino phenyl)-benzothiazol-7-sulphonic acid | 1-Naphthol-3-sulphonic acid | Sodium carbonate |
| 6-Methyl-2-(4-amino-phenyl)-benzothiazol-7-sulphonic acid | 7-Acetylamino-1-naphthol-3-sulphonic acid | Sodium carbonate |
| 6-Methyl-2-(4-amino-phenyl)-benzothiazol-7-sulphonic acid | 8-Acetylamino-1-naphthol-3,6-disulphonic acid | Sodium carbonate |
| 6-Methyl-2-(4-amino-phenyl)-benzothiazol-7-sulphonic acid | 8-Acetylamino-1-naphthol-3,5-disulphonic acid | Sodium carbonate |
| 3,3'-Dicarboxymethoxy-4,4'-diaminobiphenyl | 1-Hydroxy-6-(4-methoxy-phenylamino)-naphthalene-3-sulphonic acid | Sodium carbonate |

EXAMPLE 4

70 g of 6-amino-1-naphthol-3-sulphonic acid (I acid) are stirred in 310 ml of water and the mixture is neutralised with 40% strength sodium hydroxide solution. 35 g of acetic anhydride are then added dropwise in the course of 15 minutes. After acetylation of the amino group is complete, the pH is adjusted to 5.5 with triethanolamine and the mixture is cooled to 15° C by adding ice. The moist paste from the diazotisation, which has been isolated and consists of 80.4 g of 4'-aminoazobenzene-4-sulphonic acid (yellow acid), which was prepared in the customary manner, is stirred into the mixture. The temperature is kept at 20° C during the addition by introducing ice. At the same time, a 50:50 mixture of triethanolamine/water is added dropwise so that the pH remains constant at 4 to 4.5. The reaction has ended after about 40 minutes. p-Coupled product can be detected on the chromatogram in the flow agent mentioned in Example 1. The p-coupled product is destroyed by stirring with 5 g of sodium dithionite for 5 hours. 950 to 1,000 g of a concentrated dyestuff solution, which is used for dyeing paper in a red colour shade by the customary processes, are obtained.

EXAMPLE 5

100 g of 6-benzoylamino-1-naphthol-3-sulphonic acid are stirred in 250 ml of water and the pH is brought to 4 with tris-[2-(2-hydroxyethoxy)-ethyl]-amine. The moist paste from the diazotisation, which has been isolated and consists of 80.4 g of 4'-aminoazobenzene-4-sulphonic acid (yellow acid), is introduced, as described in Example 4, and, at the same time, a mixture of tris-[2-(2-hydroxyethoxy)-ethyl]-amine and water (50:50) is added dropwise so that a pH of 4 is maintained. If the temperature rises about 20° C, the mixture is cooled by introducing ice. When the reaction has ended, the p-coupled product can be detected by chromatography in the flow agent indicated in Example 1. The by-product can be removed by stirring for 5 hours with 5 g of sodium dithionite. Approximately 1,000 g of a concentrated dyestuff solution, which is used when dyeing cotton and paper in order to educate a bluish-tinged red, are obtained.

EXAMPLE 6

If the concentrated solution of the coupled product obtained according to Example 5 is stirred with 9 g of sodium hydroxymethanesulphinate, a solution which is also free from p-coupled product is obtained after 5 hours.

EXAMPLE 7

100 g of 6-benzoylamino-1-naphthol-3-sulphonic acid are dissolved in 250 ml of ice water, as in Example 5, and the pH is adjusted to 10 with sodium hydroxide solution. After adding the moist paste which consists of 80.4 g of diazotised 4'-aminoazobenzene-4-sulphonic acid and has been isolated, the pH is adjusted to 10 by the dropwise addition of sodium hydroxide solution and the mixture is cooled to 0° to 5° C by adding ice.

After comparison by chromatography in the flow agent mentioned in Example 1, the resulting dyestuff solution exhibits about 10% of p-coupled products. Accordingly, the reaction mixture contains about 0.26 mol of the o-coupled product and about 0.03 mol of the p-coupled product. 0.12 mol = 21 g of Na dithionite are required in order to destroy the latter. The reaction mixture is warmed to 50° C and 10 3 g portions of Na dithionite are added at intervals of 5 minutes. A sample is taken prior to each addition of further reducing agent.

After the end of the experiment, the samples are uniformly diluted and chromatographed alongside one another in the abovementioned flow agent. It is found that the p-coupled product has disappeared after the stoichiometric amount (21 g) of dithionite have been added.

EXAMPLE 8

In a dyestuff solution which was prepared as in Example 7 and which contains about 0.03 mol of the p-coupled product, 18.5 g of sodium hydroxymethanesulphinate.$2H_2O$ are required in order to destroy the latter. If the reducing agent is introduced into the solution in portions under the conditions of Example 7, the decomposition of the p-coupled product can be followed chromatographically by the method described in Example 7.

EXAMPLE 9

104 g (0.029 mol) 4-aminoazobenzene-3,4'-disulphonic acid are stirred in 1000 ml of water 40 ml of hydrochloric acid (19.5° Bé). 20 g of sodium nitrite dissolved in 70 ml of water are added dropwise. After the reaction is finished the mixture is stirred for half an hour with excess nitrous acid which is then destroyed with amidosulphonic acid. Ice is added to adjust the temperature to 0° C and sodium carbonate is added to adjust the pH to 5. Then a solution of 84.3 g (0.3 mol) 6-acetylamino-1-naphthol-3-sulphonic acid in 350 ml ice-water is added and the pH of 5 is maintained by buffering. By further addition of ice the temperature is held at 0°-5° C. When the pH does not drop any more, sodium hydroxide solution is added until a pH of 10 and after 5 minutes 5 g of sodium dithionite are added. The pH of 10 is maintained by adding dropwise sodium hydroxide solution. Immediately after the addition of the dithionite the solution brightens up, which is an indication of the destruction of the p-coupled product. When the pH of 10 does not drop any more (approx. 3 minutes) further 5 g of sodium dithionite are added under the same conditions. When the pH of 10 remains constant without further addition of sodium hydroxide, a third amount of 5 g of sodium dithionite is added. Then the p-coupled product has totally vanished (approved by paper chromatography; flow agent 160 ml of 2.5% strength sodium citrate solution and 40 ml of conc. ammonia). The total reaction time is approximately 10 minutes. The pure o-coupled product is then isolated in the convenient manner.

EXAMPLE 10

A coupling mixture obtained according to example 9 is divided in 5 equal parts. Each part is treated with 0.3 g of hydrazine hydrate (pH of 9) and with 0,1 g of the following catalysts:
1. raney-nickel, 2. copper sulphate, 3. iron sulphate, 4. sodium sulfide, 5. -.

The mixture is warmed to 50° C and every 30 minutes a sample is taken and chromatographed on paper side by side (flow agent: 160 ml of 2.5% strength sodium citrate solution and 40 ml of ammonia).

It can be seen that the p-coupled product in the reaction mixture with raney-nickel vanishes first (ca. 1 hour) followed by the mixture with copper sulphate, iron sulphate and sodium sulfide. After approximately 2 hours the p-coupled product in the reaction mixture free of catalyst is destroyed too. The reaction mixtures are treated with 5% sodium chloride. The then isolated dyestuff is free of p-coupled product. The selective destruction of the p-coupled product can be obtained in half the time, if the reduction is performed at 60° to 70° C.

EXAMPLE 11

If diazotised 6-methyl-2-(4-aminophenyl)-benzothiazole-7-sulphonic acid (32 g) is coupled with 40,5 g of 8-acetylamino-1-naphthol-3,6-disulfonic acid at 0° to 5° C in a solution alkaline with soda, p-coupled product is detected by paper chromatography (flow agent: 80 ml of n-butanol, 100 ml of pyridine, 80 ml of water, 20 ml of conc. ammonia). After warming to 50° C 0.5 ml of hydrazine hydrate and 1 g of raney-nickel are added. After ca. 1 hour at 50° C no p-coupled product can be detected by paper chromatography.

Analogous to example 11 it is possible to remove the amounts of p-coupled product from the coupling mixtures of the dye-stuffs listed in the table. Additionally to raney-nickel iron sulfate and copper sulfate can be used as catalysts. If hydrazine is used without a catalyst the reaction time is nearly doubled.

| Diazo component | coupling component |
|---|---|
| 4-aminoazobenzene-4'-sulphonic acid | 6-acetylamino-1-naphthol-3-sulphonic acid |
| " | 6-benzoylamino-1-naphthol-3-sulphonic acid |
| 4-aminoazobenzene-3,4'-sulphonic acid | " |
| aniline-2,5-disulphonic acid | |
| " | 1-naphthol-3-sulphonic acid |
| 6-methyl-2-(3-sulfo-4-aminophenyl)-benzothiazol-7-sulphonic acid | 8-benzoylamino-1-naphthol-3,6-disulfonic acid |
| 4-aminoazobenzene-4'-sulphonic acid | 7-acetylamino-1-naphthol-3-sulphonic acid |
| " | 6-phenylamino-1-naphthol-3-sulphonic acid |

We claim:
1. Process for the selective destruction of p-coupled product of a 1-naphthol coupler and a diazo compound in the presence of o-coupled products thereof which comprises treating said coupled products with hydrazine, hydrazine and a redox catalyst, a salt of dithionous acid or a salt of hydroxymethanesulphinic acid at a pH > 4 and a temperature of 10°–100° C to reduce said p-coupled product, and then separating the o-coupled products.

2. Process of claim 1, in which said 1-naphthol coupler is selected from the group consisting of 1-naphthol-3-, -5-, -6-, -7- and -8- sulphonic acid; 1-naphthol-3,6-, -3,7- and -5,7-disulphonic acid; 6- and 7-amino-1-naphthol-3-sulphonic acid; 6- and 7-acetylamino-1-naphthol-3-sulphonic acid; 6- and 7-benzoylamino-1-naphthol-3-sulphonic acid; 8-amino-1- naphthol -5-sulphonic acid; 8-acetylamino-8-benzoylamino-, 8-methylsulphonylamino- and 8-phenylsulphonylamino-1-naphthol-5-sulphonic acid; 8-amino-, 8-acetylamino- and 8-benzoylamino-1-naphthol-3,6- and 3,5-disulphonic acid; 8-amino-1-naphthol-5,7-disulphonic acid; 7-phenylamino-1-naphthol-3-sulphonic acid; and 6-(4-methoxyphenylamino)-1-naphthol-3-sulphonic acid.

3. Process of claim 1 in which the reaction is carried out at a pH of 4–6.

4. Process of claim 1 in which said hydrazine is present in an amount of about 1 mol per mol of azo groups in said p-coupled product and said dithionate and said hydroxymethane sulphinate is present in an amount of about 2 mols per mol of azo groups in said p-coupled product.

* * * * *